United States Patent [19]

Alberto

[11] Patent Number: 5,304,240
[45] Date of Patent: Apr. 19, 1994

[54] METHOD OF PRODUCING A TOTALLY WATER-BASED PAINT PRODUCT WITH DISPERSED PARTICLES AND A PAINT PRODUCT WHICH CAN BE PRODUCED BY THE METHOD

[76] Inventor: Gilli Alberto, Via V. Emanuele 75, 10020 Andezeno (Torino), Italy

[21] Appl. No.: 970,296

[22] Filed: Nov. 2, 1992

[30] Foreign Application Priority Data

Jan. 27, 1992 [IT] Italy ............................ TO92A000054

[51] Int. Cl.$^5$ ................................................ C09D 1/00
[52] U.S. Cl. .................................... 106/217; 106/416; 106/462; 106/465; 106/481
[58] Field of Search ............... 106/217, 416, 462, 465, 106/481

[56] References Cited

U.S. PATENT DOCUMENTS

| | | | |
|---|---|---|---|
| 2,591,904 | 4/1952 | Zola | 106/170 |
| 3,458,328 | 7/1969 | Zola | 106/15 |
| 4,376,654 | 3/1983 | Zola | 106/163 R |

FOREIGN PATENT DOCUMENTS

| | | |
|---|---|---|
| 0424594 | 2/1991 | European Pat. Off. . |
| 0505664 | 9/1992 | European Pat. Off. . |
| 2078243 | 6/1982 | United Kingdom . |
| 0182962 | 6/1986 | World Int. Prop. O. . |

*Primary Examiner*—Mark L. Bell
*Assistant Examiner*—Willie J. Thompson
*Attorney, Agent, or Firm*—Fish & Richardson

[57] ABSTRACT

A method of producing a totally water-based paint product with dispersed particles comprises the steps of:
  forming a first intermediate product including an aqueous colloidal solution of a non-ionic colloid, a pigment, sodium acetate and an inorganic compound in the form of acicular particles;
  adding the first intermediate product to a first aqueous solution of a precipitating agent which contains boron, and can precipitate the colloid solution, thus forming a second intermediate product;
  adding a second solution to the second intermediate product to stabilize the product and correct its viscosity, thus forming a third intermediate product, and
  adding a water-based mixture containing a resin having film-forming properties to the third intermediate product.

11 Claims, No Drawings

METHOD OF PRODUCING A TOTALLY WATER-BASED PAINT PRODUCT WITH DISPERSED PARTICLES AND A PAINT PRODUCT WHICH CAN BE PRODUCED BY THE METHOD

The present invention relates to a method of producing a paint product of the type with single- or multi-coloured dispersed particles, and to the paint product produced by the method, which can be applied by spraying and/or with rollers and/or brushes, and has good resistance to washing and abrasion.

The present state of the art includes two basic types of product with multi-coloured dispersed particles having different structures but a similar final decorative appearance, that is:

1. the water/solvent type, and
2. the totally water-based type.

The water/solvent type, which was the first product with dispersed particles, was devised and patented, for example, by U.S. Pat. No. 2,591,904 of Apr. 8, 1952 in the name of John C. Zola, and consists of a solvent base dispersed in an aqueous vehicle.

According to the method of producing this product, a resin, which is dissolved in an organic solvent and then pigmented, is dispersed in an aqueous medium, forming a two-phase system in which globules of one or more colours, according to the number of different pigmentations used, are immersed in an aqueous phase and, when sprayed onto a substrate, provide final decoration of the type required.

This method, which is based on the immiscibility of two different phases, gives rise to a product which is undoubtedly washable and resistant to abrasion but has major disadvantages such as the following:

1. it is very difficult to keep the two phases constituting the system in equilibrium and the product therefore has a limited shelf life;
2. it is impossible to vary the application system, since the product can only and exclusively be applied by means of a suitable spray system and not, for example, with a roller;
3. the chemical nature of the resin used means that it is soluble only in organic solvents, with all the attendant risks to the environment and to the health of the operators and users.

The latter is the most significant disadvantage presently encountered by products of this first type.

Subsequently, in order to eliminate these serious disadvantages, it was attempted to exclude all organic solvents and to use only aqueous bases, or at most to add very small amounts of solvents which can be dissolved or dispersed in water. Thus, water-based paints with dispersed particles were developed (U.S. Pat. Nos. 3,458,328 of Jul. 29, 1969 and 4,376,654 of Mar. 15, 1983 in the name of John C. Zola; GB patent 2078243A of Jun. 18, 1981 in the name of James D. Mann and, more recently, European patent No. 0182962 in the name of Rossetti, and European patent No. 0424594 in the name of Macri Chemical S.r.l.).

All these methods provide products with completely aqueous bases, having final appearances similar to that of a water/solvent-based product, as well as partially solving certain long term stability problems. Some of these products can also be applied by means of systems other than spraying and, lastly, they are not harmful to the environment or to human health, since the organic solvents present in the earlier types of product have been eliminated altogether.

Unfortunately, however, these products (but not even all of them) have only the final appearance of the earlier types of water/solvent-based paints but not the same resistance to washing, and even less resistance to abrasion. Furthermore, some of these products have excessively small particle sizes, so that there is a loss of contrast and the decoration is difficult to see with the naked eye. Others have long, complicated processing methods which give rise to variations in quality and difficulties with reproducibility from one batch to the next; moreover their monochrome particles are very delicate and not very strong, so that even when a slight shear force is applied, for example during roller application, the particles disintegrate and release the pigment they contain. Colour leakages which stain the base may thus occur, or the coloured particles may even be destroyed, simply as a result of hand-stirring. Problems may occur even when the paint is applied by spraying, since it is not always guaranteed that the decoration on the substrate will remain unchanged in the long term. Thus in some cases, the product lacks not only washability and abrasion resistance, but also a final appearance comparable to that of the water/solvent-based products. The only advantage is from an ecological point of view which, although it is undeniably very important, it is not so important as to cause the complete replacement of the first generation paint products with dispersed particles.

The object of the present invention is consequently to develop a method of producing a water-based paint product which can be applied with a roller, by spraying, or with a brush, which has the aesthetic characteristics of water/solvent-based products, good abrasion resistance, and excellent washability, which has hard, strong monochromatic particles which are also resistant to the large shear forces occurring during application by brush, spray or roller so as to avoid uncontrollable leaching of colour and to facilitate application to various substrates, which is completely water-based, and thus is harmless, non-malodorous, and ecologically acceptable, which has colour particles of a size such that the decorative pattern is clearly visible even to the naked eye, and is not a confused set of colours, but is a systematic design well-defined on the substrate, which is quite easy to produce, so that both the pigmentation and the sizes and physical/chemical compositions of the monochrome particles are consistent and reproducible and which has very strong colour particles in order to allow for flexibility of application, both to different types of substrate, and with the use of various application techniques, particularly roller, spray and brush systems and all the variations allowed by these systems. For example, in a spray system, the colour particles may be subjected to a wide range of different pressures, or may be sprayed by means of spray-guns with internal or external air-mixing, with various nozzle diameters or by various types of spraying equipment.

This flexibility of application was sought in order to meet the requirements both of the "do-it-yourself" market, and of professional decorators.

The object was therefore (on the basis of the existing prior art for multi-coloured water-based products) to provide a method of producing a product which would overcome both the problems of the first-generation water/solvent-based products, and the problems connected with totally water-based products, in other words, which would combine the advantages of the former and overcome the deficiencies of the latter, in order to obtain, in the best possible manner, a multi-coloured water-based product which is ecologically acceptable, easy to use, of proven stability, and highly resistant to washing and abrasion.

The object of the invention is achieved by means of a method of producing a paint product with dispersed particles, comprising the steps of:

forming a first intermediate product including an aqueous colloidal solution of a non-ionic colloid, a pigment, sodium acetate, and an inorganic compound in the form of acicular particles;

adding the first intermediate product to a first aqueous solution of a precipitating agent which contains boron and can precipitate the colloid solution thus forming a second intermediate product;

adding a second solution to the second intermediate product to stabilise the product and correct its viscosity, thus forming a third intermediate product, and adding a water-based mixture containing a resin having film-forming properties to the third intermediate product.

In particular this method produces stronger and more durable floccules which still have the correct flexibility and plasticity so that, unlike the earlier products, this product can be applied by means of spraying, using a suitable spraying system, as well as by means of other, simpler and less professional systems such as rollers or brushes. Clearly, if the floccules were gelatinous and not resistant to very large shear forces (which occur, for example, as the result of friction exerted by the roller on the substrate), in some cases they would actually be destroyed, giving rise to the foreseeable consequences described above.

In order to eliminate all these problems, and to improve the present state of the art, it has been found that the floccules are strengthened by the introduction of even a small amount of an inorganic compound in the form of acicular particles, preferably calcium silicate or metasilicate, into the formulation of the first intermediate product since the calcium silicate or metasilicate particles form a compact network inside the floccules. In fact, the acicular particles become intertwined, and thus improve the structure and strength of the floccules.

Furthermore, a quantity of sodium acetate must be introduced into the first intermediate product in order to fix the various pigmented aqueous dispersions in the individual floccules in the best possible manner, and thus to prevent the dye migrating into floccules of another colour, when the former are mixed with the latter.

It has also been found that, in the processing stage, it is much easier to achieve the required dimensions with stronger floccules. In fact, the dimensions depend on the hardness of the floccules, the viscosity of the first intermediate product, the viscosity of the aqueous solution of the precipitating agent, the viscosity of the second solution, and also on the method of mixing the various phases. By adjusting these variables, the dimensions of the floccules can be varied from small sizes to relatively substantial sizes, and for this reason, in preferred embodiments of the invention, other elements which help to improve the strength and hardness of the floccules of the finished product are introduced into the second solution.

The preferred additives for this purpose are kaolin calcined at about 1000° C. and flame-dried silica, which also acts as a thickening/anti-drip agent.

In order to improve the washability and abrasion resistance of the paint product according to the invention once it has been applied to a substrate, in a further preferred embodiment of the method according to the invention, an N-butyl acrylate and styrene copolymer with very fine particles, preferably with an average diameter of less than 0.2 microns, or other polymers mentioned below, is used as a film-forming resin.

The resin is applied to the ready-prepared floccules, in order to avoid damaging their structure, and is preferably applied under pressure, in order to permeate and coat each individual floccule completely.

Wax-coated amorphous synthetic silica is also preferably introduced into the formulation of the aqueous film-forming mixture, since this helps to increase the strength of the polymerised film, making it smooth, and, by virtue of the wax component, which acts as a slip and anti-cling agent, making it less subject to attack by water or other substances which may come into contact with the film.

By graduating the percentage of this particular silica, it is also possible consequently to graduate the final opacity or lustre of the paint product from a clear appearance to one which is completely opaque.

In the light of these innovative improvements, the various steps of the method according to the invention are now described in greater detail:

1. Sodium acetate is dissolved in water at 25°–30° C., and a colloid is then dispersed therein until it is completely dissolved; the following are then stirred into the solution: a thickening/anti-drip agent, a wetting agent, a dispersant, an anti-foaming agent, a bactericide, a pigment in aqueous dispersion, and an opacifying, structuring and reinforcing agent.

2. This first intermediate product is stirred into a solution of a precipitating agent to which thickening-/anti-drip, bactericidal and anti-foaming agents have been added. The colloid solution is precipitated.

3. A second aqueous solution containing anti-drip/-thickening, bactericidal, anti-foaming, reinforcing, opacifying, and structuring agents is added to the second intermediate product obtained. This is then allowed to mature for sufficient time to ensure that the various components of the product are completely stabilised, and that the viscosity thereof is fully balanced. These steps are repeated for however many types of different coloured floccules are to be obtained and, at this point, the various stabilised solutions of the different coloured floccules are mixed.

4. An aqueous film-forming mixture, comprising a copolymer dispersed in water, and bactericidal, anti-foaming, thickening/anti-drip, coalescing, reinforcing-/opacifying and structuring agents, is added to the third intermediate product obtained.

Preferably, the ratio between the first aqueous solution of the precipitating agent and the first intermediate product is between 0.05 and 1.900 by weight, the ratio between the second solution and the second intermediate product is between 0.02 and 2.5 by weight, and the ratio between the aqueous film-forming mixture and the third intermediate product is between 0.040 and 1.75 by weight.

It will be appreciated that it is possible to use the method according to the present invention in order to obtain floccules 100% of which are of a single colour, or to obtain monochromatic floccules of various different colours mixed in greatly varying proportions.

The method according to the invention provides a paint product which can be applied to a suitable surface either by means of a roller, with the use of a coarse synthetic roller, by means of a bristle brush, or by means of a pressurised spray gun. The paint product is in liquid form and is constituted by an aggregate of monochromatic floccules of one or more different colours immersed in an aqueous vehicle. The coloured floccules are immiscible with one another, and their colours cannot therefore be altered. When the product has been applied correctly to a substrate treated according to the technical instructions, and after it has dried and polymerised, the product is highly washable and resistant to abrasion.

Further formulative components used in the method according to the invention are now considered.

The water-soluble colloids used are preferably certain glycosidic colloids which do not undergo ionic dissociation of any type (neither cationic nor anionic) in water.

Preferably a D-galactose and D-mannose mixture, commonly known as galactomannan is used. This non-ionic colloid thickens in water, forming a structured solution which, for example in the presence of other glycosidic colloids such as the K-carragenates and xanthan gum can thicken until it becomes a gel. These colloids may be rendered insoluble and precipitated by non-ionic reaction mechanisms in the presence of specific chemical reagents listed in detail in the following description.

The wetting agent used may, for example, be a wetting agent or a mixture of wetting agents included in the following group:
1. ammonium salts of a polyacrylic acid with a low molecular weight;
2. polyglycol esters of fatty acids;
3. a solution of an alkylammonium salt of a multifunctional polymer;
4. solutions of a non-saturated polycarboxylic acid with a high molecular weight;
5. solutions of a polycarboxylic acid with a silicone polymer.

The dispersant used may, for example, be a dispersant or a mixture of dispersants included in the following group:
1. ammonium salts of a carboxylic acid;
2. linear acrylic polymers;
3. aminomethylpropanol;
4. sodium salts of polycarboxylic acids.

The anti-foaming agent used may, for example, be an anti-foaming agent or a mixture of anti-foaming agents included in the following group:
1. modified polyalkoxyethers in paraffin oil;
2. modified polysiloxane emulsions;
3. emulsions of a hydrophobic polysiloxane-polyether copolymer;
4. mineral paraffin oils in association with hydrophobic polysiloxane-polyether copolymer.

The preservative used may, for example, be a preservative or a mixture of preservatives included in the following group:
1. a mixture of N-O formals and N-S heterocycles;
2. a chlorinated isothiazoline derivative;
3. a combination of N-hydroxymethylchloroacetamide and a special organic and inorganic activator;
4. a mixture of an aliphatic hemiacetal and isothiazoline;
5. a mixture of nitrogenous organic substances having a synergic effect.

The thickening/anti-drip agent used may for example, be a thickening/anti-drip agent or a mixture of thickening/anti-drip agents included in the following group;
1. hydroxypropyl methylcellulose;
2. flame-dried silica;
3. non-ionic hydroxyethylcellulose, modified hydrophobically;
4. a mixture of polyurethanes in solution.

The pigments are used singly or in mixtures and are either organic or inorganic pigments, such as for example: titanium dioxide, yellow, black, brown or red ferrous oxides, chromium oxides, blue and green phthalocyanine, diazoic pigments, aluminium sodium silicates etc., all usable subject to dispersion in an aqueous phase.

The film-forming resin used is an aqueous emulsion of a single polymer or a mixture of polymers, selected from the following group:
1. a copolymer dispersion of vinyl acetate/acrylic esters in water;
2. a copolymer dispersion of vinyl acetate/maleic esters in water;
3. acrylic monomers in aqueous emulsion;
4. a dispersion of a styrene/acrylic copolymer in water;
5. a dispersion of a vinyl versatate-acetovinyl copolymer in water.

A compound containing boron is used as the precipitating agent for destabilising the aqueous colloid solution. Boron is classified as non-metallic, and exists naturally in the form of boric acid, borates and borosilicates.

Preferably, sodium tetraborate or tincal is used in prismatic or octahedral crystalline form and, in an aqueous solution, interferes with the aqueous solution of the glycosidic colloid, destabilising it and precipitating the colloid macromolecules.

Further additives may also be used as opacifying, structuring and reinforcing agents, in order to impart opacity (with the possible graduation of the opacity of the applied and dried film), in order to improve the structuring of the product (that is, by increasing the thixotropy or viscosity of the finished product), or in order to modify the surface characteristics either of the globules or of the final product applied to the substrate, by imparting a high level of resistance to wear and friction, or by fixing the pigment in order to prevent unsightly leaching of colour during the application stage etc. In addition to the additives listed above, these additives may, for example, be:
1. aqueous emulsions based on a high-density polyethylene wax;
2. synthetic silica;
3. anhydrous calcium sulphate (anhydride).

The following compounds for example, may be used, singly or in combination, as coalescing agents:
2-(2-butoxyethoxy)-ethanol
trimethylpentadiol diisobutyrate
the 2-butoxyethyl ether of acetic acid
the 2-(2-butoxyethoxy)-ethyl ether of acetic acid
2-butoxyethanol.

Naturally, the aforementioned products can be used either individually or mixed with each other in various proportions, and it will therefore be the responsibility of the formulating expert, depending on the circumstances, to make the most suitable choice in order to obtain, for example, the required size of the decorative particles, the most suitable colour or combinations of colours, the degree of lustre or opacity required, the greater or lesser viscosity of the product during the application stage, the thixotropy of the product in the tin, the final odour of the product, its ability to polymerise under various conditions, and its resistance to attack by bacteria etc.

The individual steps of the method according to the invention will now be considered in greater detail.

The first step of the method involves the formation of the first intermediate product, which is preferably carried out in a container with a drain valve and with a dispersing mechanism equipped with a bladed or screw rotor. The water used is preferably heated to 25°–35° C. and the motion of the blade or screw takes place from the top of the liquid to the bottom and vice versa, with a variable number of revolutions per minute. Firstly, the sodium acetate is introduced and is dissolved by stirring, then the colloid to be dissolved is introduced, and is dispersed at medium to high speed for the amount of time necessary to dissolve it completely. The thickening/anti-drip agent is then added, and the mass is stirred at medium to high speed until it is completely homogeneous. The following are then introduced in succession: the wetting agent, the dispersant, the anti-foaming agent, the bactericide and the pigments in aqueous dispersion, selected on the basis of the final colour of the decorative particles to be obtained. The opacifying/structuring and reinforcing agents are then introduced, in order to provide greater strength and colour-fastness and are dispersed at high speed for a few minutes, after which the dispersion speed is decreased and the product as a whole is allowed to homogenise. In this way the first intermediate product is prepared.

A container which has a drain valve and, into which water, preferably heated to 25°–30° C., is introduced and a dispersing mechanism with a bladed or screw rotor, of which the speed and height can be adjusted are also used to prepare the aqueous solution of the precipitating agent.

The rotor is immersed in the water in the container to which the thickening/anti-drip agent is added, and is rotated at medium to low speed. The precipitating agent, the bactericide and the anti-foaming agent are then added in succession. These are dispersed at a medium to low speed of rotation for sufficient time for the thickening/anti-drip agent to take effect, and for the solution to become homogeneous, and for its components to be dissolved. The first intermediate product is then added, again with stirring, by being discharged from the drain valve of the first container in a steady flow.

The colloid is thus precipitated by the precipitating agent, resulting in the formation of colour particles, which will form the decoration in the final product. These colour particles in solution constitute the second intermediate product.

The second aqueous solution is prepared separately and consists of water in which the anti-drip/thickening agent is dispersed by means of slow stirring. When the solution is perfectly homogeneous, the following are added in succession: the bactericide, the anti-foaming agent, and when the dispersion has been completed, the opacifying/structuring and reinforcing agent. After this addition, the speed of rotation is increased, and stirring is continued for long enough to ensure that any agglomerates present are dispersed in the product. As in the previous cases, the equipment required for this operation consists of a dispersing mechanism equipped with a rotor, suitable for fast dispersion, of adjustable speed and height, and of a container with a drain valve.

The second solution is added to the second intermediate product with slow but continuous stirring. The mixture is then allowed to rest and mature for sufficient time to ensure that the third intermediate product obtained is completely stable and homogeneous. This maturing time is necessary mainly in order to achieve the correct degrees of thickening (viscosity), structuring (thixotropy), opacification, and resistance to dripping required for the finished product, which thus assumes all the characteristics which amount to those listed above, such as colour-fastness, washability, abrasion resistance etc. When maturing has been completed, the coloured floccules of the various shades are mixed in the required proportions, with the use of a container of suitable proportions for the purpose, associated with a mixer equipped with a speed variator and a fixed rotor, for keeping the mass of coloured floccules moving and mixing slowly. The mixer must be hermetically sealed so that it can operate both under pressure and under vacuum. When mixing is completed the floccules are added to the aqueous film-forming mixture previously prepared, by means of a dispersing mechanism and a container similar to those considered above.

The aqueous film-forming dispersion is prepared from water, to which a copolymer dispersed in water, the bactericide and the anti-foaming agent are added. This mixture is stirred slowly until the two additives are incorporated into the mass of copolymer present in the tank. Subsequently the thickening/anti-drip agent is introduced and stirred for a few minutes, then the coalescent is trickled into the tank, and the reinforcing-/opacifying and structuring agents are then added, and the mixture is mixed at medium to high speed until a homogeneous solution is obtained. This aqueous film-forming mixture is added to the third intermediate product still with slow stirring, and more importantly, under a slight pressure of approximately 1.5 bars.

The inlet for the aqueous film-forming mixture should preferably be positioned in the lower portion of the container where the mixing takes place, in order to ensure that the addition under pressure of this film-forming mixture takes place within the mass of floccules.

This measure, together with the slow stirring and the pressure, confers on the product not only the requirements of considerably improved abrasion resistance and greater washability already mentioned but also a certain resistance to chemical agents and good colourfastness and colour does not leach from the various floccules, by virtue of the intrinsic strength and hardness they acquire.

With continued slow stirring, the working pressure is dropped to below atmospheric pressure (down to approximately 0.5 bars), in order to release from the product any air incorporated during the previous operations and to complete the preparation of the product in the best possible manner. After this, the mixing container is brought back to ambient pressure.

Testing is then carried out, by the checking of the final viscosity of the product and its subjection to various tests and application trials. At this stage, if the viscosity is high, it can be corrected by the addition of a small amount of water. When all the physical parameters of the product meet the required standards, the product is put into tins, and slow stirring is continued for as long as possible. The product is then ready for use.

A formulation for a water-based paint product according to the invention will now be given by way of non-limiting example.

EXAMPLE

First of all, the compositions of the various intermediate products/solutions/mixtures added in succession are given, expressed in parts by weight (p.w.).

| FIRST INTERMEDIATE PRODUCT | |
|---|---|
| 1. water | to make up to 100 |
| 2. sodium acetate | from 0.5 to 7 |
| 3. non-ionic colloid (a mixture of D-galactose and D-mannose) | from 1 to 15 |
| 4. thickening/anti-drip agent (a mixture of polyurethanes in solution) | from 0.1 to 20 |
| 5. wetting agent (polyglycol esters of fatty acids) | from 0.01 to 3.5 |
| 6. dispersant (series of linear acrylic polymers) | from 0.01 to 3.5 |
| 7. anti-foaming agent (modified polyalkoxyethers in paraffin oil) | from 0.05 to 4 |
| 8. bactericide (a combination of N-hydroxymethylchloroacetamide and a special organic and inorganic actuator) | from 0.05 to 4 |
| 9. pigment in aqueous dispersion | from 1 to 40 |
| 10. opacifying, structuring and reinforcing agent (calcium silicate or metasilicate) | from 1 to 25 |
| TOTAL | p.w. 100 |

When a non-monochromatic paint product is to be prepared, in other words a product which has floccules of two or more different colours, it is necessary to prepare as many first intermediate products as there are colours of floccules required and naturally, to ensure that the pigment dispersion (or mixture of pigment dispersions) in the formulation is changed, according to the colour required. The aforementioned formulation is therefore repeated and the pigment (indicated in point 9) replaced by another type of pigment, for a number of times equal to the number of different colours of floccules to be obtained.

| AQUEOUS SOLUTION OF THE PRECIPITATING AGENT | |
|---|---|
| 1. water | to make up to 100 |
| 2. thickening/anti-drip agent (non-ionic hydroxyethyl celllose polymer, modified hydrophobically) | from 0.100 to 5 |
| 3. precipitating agent (prismatic sodium borate decahydrate) | from 0.250 to 17.500 |
| 4. bactericide (a combination of N-hydroxymethylchloroacetamide a special organic and inorganic activator) | from 0.050 to 5 |
| 5. anti-foaming agent (an emulsion of a hydrophobic polyether-polysiloxane copolymer) | from 0.050 to 5,500 |
| Total p.w. 100 | |

| SECOND SOLUTION | |
|---|---|
| 1. water | to make up to 100 |
| 2. anti-drip/thickening agent (non-ionic hydroxyethyl cellulose, polymer, modified hydrophobically) | from 0.100 to 5.100 |
| 3. anti-drip/thickening agent (flame dried silica) | from 0.100 to 6 |
| 4. bactericide (a combination of N-hydroxymethylchloroacetamide and a special organic and inorganic activator) | from 0.050 to 4.800 |
| 5. anti-foaming agent (an emulsion of a hydrophobic polyether-polysiloxane copolymer) | from 0.050 to 5.350 |
| 6. opacifying/structuring and reinforcing agent (kaolin calcined at approximately 1000° C.) | from 1.100 to 26 |
| Total p.w. 100 | |

| FILM-FORMING AQUEOUS MIXTURE | |
|---|---|
| 1. water | to make up to 100 |
| 2. copolymer dispersed in water (a dispersion in water of an acrylic-styrene copolymer) | from 40 to 95 |
| 3. bactericide (a combination of N-hydroxymethylchloroacetamide and a special organic and inorganic activator) | from 0.050 to 5.1 |
| 4. anti-foaming agent (an emulsion of a hydrophobic polyether-polysiloxane copolymer) | from 0.050 to 5.350 |
| 5. thickening/anti-drip agent (a mixture of polyurethanes in solution) | from 0.050 to 18.500 |
| 6. coalescent agent (2-butoxyethanol) | from 0.4 to 10 |
| 7. reinforcing, opacifying, structuring agent (wax-coated amorphous synthetic silica) | from 0.3 to 18.200 |
| Total p.w. 100 | |

The following scheme indicates the quantities of the various intermediate products/solutions/mixtures, the composition of which has previously been indicated, which can be used in order to obtain a paint product having floccules of two different colours, and indicated as

| MULTICOLOURED WHITE/PINK | |
|---|---|
| 1. aqueous solution of precipitating agent | from 5 to 40 |
| 2. first, white intermediate product | from 10 to 45 |
| the mixing of the products 1 and 2 produces the white floccules (the second intermediate product), to which the second solution is added. | |
| 3. second solution | from 2 to 25 |
| The pink floccules are prepared separately and in similar manner. | |
| 4. aqueous solution of precipitating agent | from 5 to 40 |
| 5. first, pink intermediate product | from 10 to 45 |
| The mixing of the products 4 and 5 produces the pink floccules (the second intermediate product), to which the second solution is added. | |
| 6. second solution | from 2 to 25 |
| The two types of floccules; which the second solution has been added, are then mixed, and the film-forming aqueous dispersion is added to this mixture. | |
| 7. film-forming aqueous dispersion | from 10 to 50 |
| | Total |

| MULTICOLOURED WHITE/PINK | |
|---|---|
| | p.w. 100 |

The product is completed by any necessary adjustment of its viscosity, according to the required standards.

If the information from the preceding scheme is combined with the ranges of compositions indicated for the various intermediate products/solutions/mixtures, the following scheme, which gives the ranges of possible compositions of the final product, is obtained.

| MULTICOLOURED WHITE/PINK BROKEN DOWN INTO ITS COMPONENTS | |
|---|---|
| 1. water | to make up to 100 |
| 2. thickening/anti-drip agent (non-ionic hydroxyethyl cellulose polymer modified hydrophobically) | from 0.014 to 6.545 |
| 3. precipitating agent (prismatic sodium decahydrate borate) | from 0.024 to 14 |
| 4. anti-foaming agent (an emulsion of a hydrophobic polyether-polysiloxane copolymer) | from 0.011 to 9.749 |
| 5. sodium acetate | from 0.100 to 6.300 |
| 6. non-ionic colloid (a mixture of D-galactose and D-mannose) | from 0.200 to 13.500 |
| 7. thickening/anti-drip agent (a mixture of polyurethanes in solution) | from 0.020 to 18 |
| 8. wetting agent (polyglycol esters of fatty acids) | from 0.002 to 2.700 |
| 9. dispersant (series of linear acrylic polymers) | from 0.002 to 3.150 |
| 10. anti-foaming agent (modified polyalkoxyether in paraffin oil) | from 0.010 to 3.600 |
| 11. bactericide (a combination of N-hydroxymethylchloroacetamide and a special organic and inorganic activator) | from 0.211 to 12.550 |
| 12. pigment in aqueous dispersion (titanium dioxide) | from 0.200 to 36 |
| 13. opacifying, structuring and reinforcing agent (calcium silicate or metasilicate) | from 0.200 to 22.50 |
| 14. anti-drip/thickening agent (flame dried silica) | from 0.004 to 3.000 |
| 15. opacifying, structuring and reinforcing agent (kaolin calcined at approximately 1000° C.) | from 0.044 to 13 |
| 16. pigment in aqueous dispersion (red iron oxide) | from 0.100 to 18 |
| 17. copolymer dispersed in water (a dispersion in water of an acrylic-styrene copolymer) | from 4 to 47.500 |
| 18. coalescent agent (2-butoxyethanol) | from 0.040 to 5 |
| 19. reinforcing/ opacifying and | from 0.030 to 9.100 |

| MULTICOLOURED WHITE/PINK BROKEN DOWN INTO ITS COMPONENTS | |
|---|---|
| amorphous synthetic silica) | |
| TOTAL | p.w. 100 |

What is claimed is:

1. A method of producing a paint product with dispersed particles, comprising the steps of:
    forming a first intermediate product including an aqueous colloidal solution of a non-ionic colloid, a pigment, sodium acetate, and an inorganic compound in the form of acicular particles;
    adding the first intermediate product to a first aqueous solution of a precipitating agent which contains boron and can precipitate the colloid solution, thus forming a second intermediate product;
    adding a second solution to the second intermediate product to stabilise the product and correct its viscosity, thus forming a third intermediate product, and
    adding a water-based mixture containing a resin having film-forming properties to the third intermediate product.

2. A method according to claim 1, wherein the inorganic compound in the form of acicular particles is selected from calcium silicate and calcium metasilicate.

3. A method according to claim 1, wherein the second solution includes a component selected from the group consisting of kaolin, flame dried silica, and a kaolin-flame dried silica mixture.

4. A method according to claim 1, wherein the water-based mixture includes, as a resin having film-forming properties, a copolymer of N-butylacrylate and styrene in the form of particles having an average diameter of less than 0.2 microns, and wax-coated amorphous synthetic silica.

5. A method according to claim 1, wherein the ratio between the first aqueous solution of a precipitating agent and the first intermediate product is between 0.05 and 1.9 by weight.

6. A method according to claim 1, wherein the ratio between the second aqueous solution and the second intermediate product is between 0.02 and 2.5 by weight.

7. A method according to claim 1, wherein the ratio between the water-based film-forming mixture and the third intermediate product is between 0.04 and 1.75 by weight.

8. A method according to claim 1, wherein the precipitating agent is sodium tetraborate.

9. A method according to claim 1, wherein the colloid is selected from the group consisting of D-galactose, D-mannose and mixtures thereof.

10. A method according to claim 1, wherein the water-based film-forming mixture is added to the third intermediate product in a pressurised container, preferably at approximately 1.5 bars.

11. A paint product with dispersed particles produced in accordance with the method of claim 1.

* * * * *

UNITED STATES PATENT AND TRADEMARK OFFICE
CERTIFICATE OF CORRECTION

PATENT NO.   : 5,304,240

DATED        : April 19, 1994

INVENTOR(S)  : Gilli Alberto

It is certified that error appears in the above-identified patent and that said Letters Patent is hereby corrected as shown below:

Column 11, line 61, left side of entry number 19, after "opacifying and" insert  --structuring agent (wax-coated--.

Signed and Sealed this

Thirty-first Day of October 1995

Attest:

BRUCE LEHMAN

Attesting Officer     Commissioner of Patents and Trademarks